US009359475B1

(12) United States Patent
Lin et al.

(10) Patent No.: US 9,359,475 B1

(45) Date of Patent: Jun. 7, 2016

(54) AQUEOUS-PHASE CATALYST COMPOSITIONS AND METHOD FOR PREPARING POLYPHENYLENE ETHER

(71) Applicant: INDUSTRIAL TECHNOLOGY RESEARCH INSTITUTE, Hsinchu (TW)

(72) Inventors: Chung-Cheng Lin, Kaohsiung (TW); Hsuan-Wei Lee, Pingtung (TW); Wei-Ta Yang, Taoyuan (TW); I-Hong Lin, Luodong Township (TW); Chi-Wei Chen, Taipei (TW); Hou Yuan Chen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/585,906

(22) Filed: Dec. 30, 2014

(30) Foreign Application Priority Data

Dec. 5, 2014 (TW) ............................ 103142304 A

(51) Int. Cl.
*C08G 65/38* (2006.01)
*C08G 65/44* (2006.01)
*C08G 2/00* (2006.01)

(52) U.S. Cl.
CPC .................................... *C08G 65/44* (2013.01)

(58) Field of Classification Search
CPC ............................... C08G 65/44; C08G 65/46
USPC ........................................................ 528/217
See application file for complete search history.

(56) References Cited

U.S. PATENT DOCUMENTS

| | | | | |
|---|---|---|---|---|
| 3,974,229 A | | 8/1976 | Van Sorge | |
| 4,778,880 A | * | 10/1988 | Symes ................ | C07D 295/15 522/31 |
| 4,895,929 A | * | 1/1990 | Abe ...................... | C08G 65/44 528/212 |
| 6,759,507 B1 | | 7/2004 | Yoshida et al. | |
| 7,649,075 B2 | | 1/2010 | Nishide et al. | |
| 2002/0040126 A1 | | 4/2002 | Takeda et al. | |
| 2005/0070685 A1 | | 3/2005 | Mitsui et al. | |
| 2008/0071059 A1 | | 3/2008 | Nishide et al. | |
| 2011/0034661 A1 | | 2/2011 | Maeda et al. | |
| 2014/0323666 A1 | | 10/2014 | Lin et al. | |

FOREIGN PATENT DOCUMENTS

| | | |
|---|---|---|
| CN | 1164650 C | 9/2004 |
| CN | 100422237 C | 10/2008 |
| CN | 101544755 B | 12/2010 |
| CN | 101497692 B | 3/2011 |
| CN | 102633821 A | 8/2012 |
| CN | 103709398 A | 4/2014 |
| TW | 200304456 A | 10/2003 |
| TW | 201441277 A | 11/2014 |

OTHER PUBLICATIONS

Higashimura et al., "Highly Regioselective Oxidative Polymerization of 4-Phenoxyphenol to Poly(1,4-phenylene oxide) Catalyzed by Tyrosinase Model Complexes", J. Am. Chem. Soc., vol. 120, No. 33, 1998 (published on Web Aug. 7, 1998), pp. 8529-8530.

Kim et al., "Peroxidase-Catalyzed Oxidative Polymerization of Phenol with a Nonionic Polymer Surfactant Template in Water", Macromolecular Bioscience, vol. 4, 2004, pp. 497-502.

Kim et al., "Regioselective Synthesis of Poly(phenylene) as a Complex with Poly(ethylene glycol) by Template Polymerization of Phenol in Water", Macromolecules, vol. 36, No. 14, 2003 (published on Web Jun. 11, 2003), pp. 5058-5060.

Saito et al., "Catalyzed oxidative polymerization to form poly(2,6-dimethyl-1,4-phenylene oxide) in water using water-soluble copper complex", Polymer, vol. 47, 2006 (available online Aug. 8, 2006), pp. 6581-6584.

Zhao et al., "The Effect of Ligand Molecular Weight on Copper Salt Catalyzed Oxidative Coupling Polymerization of 2,6-Dimethylphenol", Journal of Applied Polymer Science, vol. 117, 2010 (published online May 12, 2010), pp. 3473-3481.

Taiwanese Office Action and Search Report, dated Sep. 22, 2015, for Taiwanese Application No. 103142304.

* cited by examiner

*Primary Examiner* — Terressa Boykin

(74) *Attorney, Agent, or Firm* — Birch, Stewart, Kolasch & Birch, LLP

(57) ABSTRACT

An aqueous-phase catalyst composition including a metal ion including copper, nickel, manganese or iron and a water-soluble linear polymer having a molecular weight ranging from 1,000 to 20,000 is provided. The metal ion and the water-soluble linear polymer have a weight ratio of 1:1 to 1:5. A method for preparing polyphenylene ether including providing the disclosed aqueous-phase catalyst composition and adding phenolic monomers to the aqueous-phase catalyst composition to proceed to a polymerization reaction to prepare polyphenylene ether is also provided.

16 Claims, No Drawings

AQUEOUS-PHASE CATALYST COMPOSITIONS AND METHOD FOR PREPARING POLYPHENYLENE ETHER

CROSS REFERENCE TO RELATED APPLICATIONS

This Application claims priority of Taiwan Patent Application No. 103142304, filed on Dec. 5, 2014, the entirety of which is incorporated by reference herein.

TECHNICAL FIELD

The technical field relates to an aqueous-phase catalyst composition and a method for preparing polyphenylene ether (PPE) using the aqueous-phase catalyst composition.

BACKGROUND

Polyphenylene ether (PPE) is classified as a high-performance material which has the characteristics of heat resistance, flame resistant, light weight, etc. It is widely applied in various industries, such as the general industry, the electronics industry, the automotive industry, the consumer goods industry, etc. The global market demand for PPE is around 200,000 tons per year.

For the past few years, the technical development of modified-PPE (m-PPE) has improved demand for polyphenylene ether material and its application in various fields. The modified PPE can be applied in compatibilizers, flame retardant additives, and thermoplastic composite materials, and is especially appropriate for adoption as high-frequency substrate raw material due to its high dimension stability and low dielectric properties. However, in industry, polyphenylene ether (PPE) is mainly produced through solvent methods requiring the use of a great amount of organic solvents, resulting in high manufacturing costs and causing severe pollution and harm to the environment.

SUMMARY

In accordance with one embodiment of the disclosure, an aqueous-phase catalyst composition is provided. The aqueous-phase catalyst composition comprises a metal ion comprising copper, nickel, manganese or iron and a water-soluble linear polymer having a molecular weight ranging from 1,000 to 20,000, wherein the metal ion and the water-soluble linear polymer have a weight ratio of 1:1 to 1:5.

In accordance with one embodiment of the disclosure, a method for preparing polyphenylene ether is provided. The preparation method comprises providing the disclosed aqueous-phase catalyst composition and adding phenolic monomers to the aqueous-phase catalyst composition to proceed to a polymerization reaction to prepare polyphenylene ether (PPE).

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

In accordance with one embodiment of the disclosure, an aqueous-phase catalyst composition is provided. The aqueous-phase catalyst composition comprises a metal ion comprising copper, nickel, manganese or iron and a water-soluble linear polymer having a molecular weight ranging from 1,000 to 20,000. The metal ion and the water-soluble linear polymer have a weight ratio of 1:1 to 1:5.

In some embodiments, when the metal ion is selected from a copper ion, the copper ion may be derived from copper (I) chloride, copper (I) bromide, copper (II) chloride, copper (II) bromide, copper (II) acetylacetonate or a combination thereof. When the metal ion is selected from a nickel ion, the nickel ion may be derived from nickel chloride, nickel bromide, nickel oxide, nickel acetate or a combination thereof. When the metal ion is selected from a manganese ion, the manganese ion may be derived from manganese chloride, manganese bromide, manganese oxide, manganese acetylacetonate or a combination thereof. When the metal ion is selected from an iron ion, the iron ion may be derived from iron (III) chloride, iron (III) bromide, iron (II) chloride, iron (II) bromide, iron (III) acetylacetonate or a combination thereof.

In some embodiments, the water-soluble linear polymer may comprise polyethylene glycol (PEG), polyvinyl alcohol (PVA) or polyitaconic acid (PIA).

In some embodiments, the water-soluble linear polymer may be represented by the following structural formula.

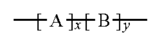

In the structural formula, A may comprise at least one carboxyl group (for example, —COOH, —$CF_2$COOH, —$CH_2$COOH, —$CH_3CH_2$COOH, —$C_6H_4$COOH or —$CHCO_2H(CO_2H)$) or amide group (for example, —$CONH_2$, —$CONHCH_3$ or —$CONHCH_2CH_2OH$), B may comprise at least one of at least one carboxyl group (for example, —COOH, —$CF_2$COOH, —$CH_2$COOH, —$CH_3CH_2$COOH, —$C_6H_4$COOH or —$CHCO_2H(CO_2H)$) and carboxyl group (for example, —COOH, —$CF_2$COOH, —$CH_2$COOH, —$CH_3CH_2$COOH, —$C_6H_4$COOH or —$CHCO_2H(CO_2H)$) and amide group (for example, —$CONH_2$, —$CONHCH_3$ or —$CONHCH_2CH_2OH$), x value may range from 1 to 100, and y value may range from 1 to 100.

In some embodiments, A in the structural formula may comprise acrylic acid, methacrylic acid, itaconic acid, crotonic acid, maleic acid or fumaric acid, or acrylic amide, methacrylic amide or 4-(2-hydroxyethylamino)-2-methylene-4-oxobutanoic acid (HEAMOBA). B in the structural formula may comprise acrylic acid, methacrylic acid, itaconic acid, crotonic acid, maleic acid or fumaric acid, or acrylic amide, methacrylic amide or 4-(2-hydroxyethylamino)-2-methylene-4-oxobutanoic acid (HEAMOBA).

In some embodiments, when the water-soluble linear polymer is represented by the afore-mentioned structural formula $$(\text{—}[A]_x[B]_y\text{—}),$$

the water-soluble linear polymer may have a molecular weight ranging from 1,000 to 20,000 or 4,000 to 8,500.

In some embodiments, the water-soluble linear polymer may be represented by the following formula.

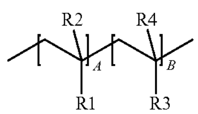

In the formula, R1 may comprise carboxyl group (for example, —COOH, —$CF_2$COOH, —$CH_2$COOH, —$CH_3CH_2$COOH, —$C_6H_4$COOH or —$CHCO_2H(CO_2H)$) or amide group (for example, —$CONH_2$, —$CONHCH_3$ or —$CONHCH_2CH_2OH$), R2 may comprise hydrogen, C1-C9 alkyl group or carboxyl group (for example, —COOH, —$CF_2$COOH, —$CH_2$COOH, —$CH_3CH_2$COOH, —$C_6H_4$COOH or —$CHCO_2H(CO_2H)$), R3 may comprise carboxyl group (for example, —COOH, —$CF_2$COOH, —$CH_2$COOH, —$CH_3CH_2$COOH, —$C_6H_4$COOH or —$CHCO_2H(CO_2H)$) or amide group (for example, —$CONH_2$, —$CONHCH_3$ or —$CONHCH_2CH_2OH$), R4 may comprise carboxyl group (for example, —COOH, —$CF_2$COOH, —$CH_2$COOH, —$CH_3CH_2$COOH, —$C_6H_4$COOH or —$CHCO_2H(CO_2H)$), A value may range from 1 to 100, and B value may range from 1 to 100.

In the formula, when R1 is —COOH, R2 is —$CH_2$COOH, R3 is —COOH and R4 is —$CH_2$COOH, the water-soluble linear polymer is "polyitaconic acid". When R1 is —COOH, R2 is —H, R3 is —$CONHCH_2CH_2OH$ and R4 is —COOH, the water-soluble linear polymer is "poly(acrylic acid-co-Ita-HEAMOBA)". When R1 is —$CONH_2$, R2 is —H, R3 is —COOH and R4 is —COOH, the water-soluble linear polymer is "poly(acrylamide-co-itaconic acid)". When R1 is —$CONH_2$, R2 is —H, R3 is —$CONHCH_2CH_2OH$ and R4 is —COOH, the water-soluble linear polymer is "poly(acrylamide-co-Ita-HEAMOBA)".

In some embodiments, when the water-soluble linear polymer is represented by the afore-mentioned formula

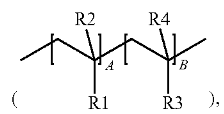

the water-soluble linear polymer may have a molecular weight ranging from 1,000 to 20,000 or 4,000 to 8,500.

In one embodiment, the metal ion and the water-soluble linear polymer may have a weight ratio of 1:1 to 1:5 or 1:1.5 to 1:4.5.

In accordance with one embodiment of the disclosure, a method for preparing polyphenylene ether (PPE) is provided. The preparation method comprises providing an aqueous-phase catalyst composition and adding phenolic monomers to the aqueous-phase catalyst composition to proceed to a polymerization reaction to prepare polyphenylene ether (PPE).

In some embodiments, the aqueous-phase catalyst composition comprises a metal ion, for example, copper, nickel, manganese or iron, and a water-soluble linear polymer having a molecular weight ranging from 1,000 to 20,000. The metal ion and the water-soluble linear polymer may have a weight ratio of 1:1 to 1:5.

In some embodiments, when the metal ion is selected from a copper ion, the copper ion may be derived from copper (I) chloride, copper (I) bromide, copper (II) chloride, copper (II) bromide, copper (II) acetylacetonate or a combination thereof. When the metal ion is selected from a nickel ion, the nickel ion may be derived from nickel chloride, nickel bromide, nickel oxide, nickel acetate or a combination thereof. When the metal ion is selected from a manganese ion, the manganese ion may be derived from manganese chloride, manganese bromide, manganese oxide, manganese acetylacetonate or a combination thereof. When the metal ion is selected from an iron ion, the iron ion may be derived from iron (III) chloride, iron (III) bromide, iron (II) chloride, iron (II) bromide, iron (III) acetylacetonate or a combination thereof.

In some embodiments, the water-soluble linear polymer may comprise polyethylene glycol (PEG), polyvinyl alcohol (PVA) or polyitaconic acid (PIA).

In some embodiments, the water-soluble linear polymer may be represented by the following structural formula.

$$-\!\!\left[A\right]_x\!\left[B\right]_y\!-$$

In the structural formula, A may comprise at least one carboxyl group (for example, —COOH, —$CF_2$COOH, —$CH_2$COOH, —$CH_3CH_2$COOH, —$C_6H_4$COOH or —$CHCO_2H(CO_2H)$) or amide group (for example, —$CONH_2$, —$CONHCH_3$ or —$CONHCH_2CH_2OH$), B may comprise at least one of at least one carboxyl group (for example, —COOH, —$CF_2$COOH, —$CH_2$COOH, —$CH_3CH_2$COOH, —$C_6H_4$COOH or —$CHCO_2H(CO_2H)$) and carboxyl group (for example, —COOH, —$CF_2$COOH, —$CH_2$COOH, —$CH_3CH_2$COOH, —$C_6H_4$COOH or —$CHCO_2H(CO_2H)$) and amide group (for example, —$CONH_2$, —$CONHCH_3$ or —$CONHCH_2CH_2OH$), x value may range from 1 to 100, and y value may range from 1 to 100.

In some embodiments, A in the structural formula may comprise acrylic acid, methacrylic acid, itaconic acid, crotonic acid, maleic acid or fumaric acid, or acrylic amide, methacrylic amide or 4-(2-hydroxyethylamino)-2-methylene-4-oxobutanoic acid (HEAMOBA). B in the structural formula may comprise acrylic acid, methacrylic acid, itaconic acid, crotonic acid, maleic acid or fumaric acid, or acrylic amide, methacrylic amide or 4-(2-hydroxyethylamino)-2-methylene-4-oxobutanoic acid (HEAMOBA).

In some embodiments, when the water-soluble linear polymer is represented by the afore-mentioned structural formula

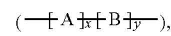

the water-soluble linear polymer may have a molecular weight ranging from 1,000 to 20,000 or 4,000 to 8,500.

In some embodiments, the water-soluble linear polymer may be represented by the following formula.

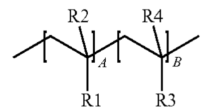

In the formula, R1 may comprise carboxyl group (for example, —COOH, —$CF_2$COOH, —$CH_2$COOH, —$CH_3CH_2$COOH, —$C_6H_4$COOH or —$CHCO_2H(CO_2H)$) or amide group (for example, —$CONH_2$, —$CONHCH_3$ or —$CONHCH_2CH_2OH$), R2 may comprise hydrogen, C1-C9 alkyl group or carboxyl group (for example, —COOH, —$CF_2$COOH, —$CH_2$COOH, —$CH_3CH_2$COOH, $-C_6H_4COOH$ or $-CHCO_2H(CO_2H)$), R3 may comprise carboxyl group (for example, $-COOH$, $-CF_2COOH$, $-CH_2COOH$, $-CH_3CH_2COOH$, $-C_6H_4COOH$ or $-CHCO_2H(CO_2H)$) or amide group (for example, $-CONH_2$, $-CONHCH_3$ or $-CONHCH_2CH_2OH$), R4 may comprise carboxyl group (for example, $-COOH$, $-CF_2COOH$, $-CH_2COOH$, $-CH_3CH_2COOH$, $-C_6H_4COOH$ or $-CHCO_2H(CO_2H)$), A value may range from 1 to 100, and B value may range from 1 to 100.

In some embodiments, when the water-soluble linear polymer is represented by the afore-mentioned formula

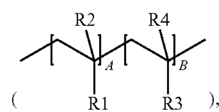

the water-soluble linear polymer may have a molecular weight ranging from 1,000 to 20,000 or 4,000 to 8,500.

In one embodiment, the metal ion and the water-soluble linear polymer may have a weight ratio of 1:1 to 1:5 or 1:1.5 to 1:4.5.

In some embodiments, the phenolic monomer may be represented by the following formula.

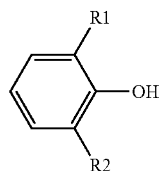

In the formula, R1 and R2 may independently comprise hydrogen, C1-C6 alkyl group or phenyl group.

In one embodiment, the polymerization reaction may be an oxidative polymerization reaction.

In one embodiment, the method for preparing polyphenylene ether (PPE) further comprises adding a surfactant to the aqueous-phase catalyst composition to proceed to the polymerization reaction.

EXAMPLES

Example 1

Preparation of the Polyphenylene Ether (1) (the Water-Soluble Linear Polymer in the Aqueous-Phase Catalyst Composition: PEG (Mn=1,000); Metal Ion: Water-Soluble Linear Polymer=1:1.8 (Weight Ratio))

First, 0.56 g of $CuBr_2$ (2.5 mmol), 1 g of polyethylene glycol (PEG1000) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in tetrahydrofuran (THF) and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

Example 2

Preparation of the Polyphenylene Ether (2) (the Water-Soluble Linear Polymer in the Aqueous-Phase Catalyst Composition: PVA (Mn=10,000); Metal Ion: Water-Soluble Linear Polymer=1:1.8 (Weight Ratio))

First, 0.56 g of $CuBr_2$ (2.5 mmol), 1 g of polyvinyl alcohol (PVA) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stifling for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

Example 3

Preparation of the Polyphenylene Ether (3) (the Water-Soluble Linear Polymer in the Aqueous-Phase Catalyst Composition: PIA (Mn=3,500); Metal Ion: Water-Soluble Linear Polymer=1:1.8 (Weight Ratio))

First, 0.56 g of $CuBr_2$ (2.5 mmol), 1 g of polyitaconic acid (PIA) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

Example 4

Preparation of the Polyphenylene Ether (4) (the Water-Soluble Linear Polymer in the Aqueous-Phase Catalyst Composition: Poly(Itaconic Acid-Co-Acrylamide) (Mn=6,700); Metal Ion: Water-Soluble Linear Polymer=1:1.5 (Weight Ratio))

(I) Preparation of the Poly(Itaconic Acid-Co-Acrylamide)

First, 6 g of itaconic acid (46.1 mmol), 4 g of acrylic amide (56.3 mmol) and 0.5 g of azobisisobutyronitrile (AIBN) (0.31 mmol) were dissolved in 130 mL of water under 70° C. while being stirred for 5 days to perform a polymerization reaction to obtain a resulting solution. After the reaction was completed, most of water was evaporated under reduced pressure. The resulting solution was then added to methanol/ethyl acetate to perform re-precipitation to obtain poly(itaconic acid-co-acrylamide). The poly(itaconic acid-co-acrylamide) was analyzed by $^1$H NMR and the data are shown as follows.

$^1$H NMR (d-MeOH, 400 MHz): δ=3.0-2.4 (2H), 2.4-1.8 (3H), 1.8-1.2 (2H).

(II) Preparation of the Polyphenylene Ether

First, 0.56 g of $CuBr_2$ (2.5 mmol), 0.84 g of poly(itaconic acid-co-acrylamide) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

Example 5

Preparation of the Polyphenylene Ether (5) (the Water-Soluble Linear Polymer in the Aqueous-Phase Catalyst Composition: Poly(Ita-HEAMOBA-Co-Acrylic Acid) (Mn=4,800); Metal Ion: Water-Soluble Linear Polymer=1:1.5 (Weight Ratio))

(I) Preparation of the Poly(Ita-HEAMOBA-Co-Acrylic Acid)

First, 6.4 g of Ita-HEAMOBA (37 mmol), 4 g of acrylic acid (55.6 mmol) and 0.5 g of AIBN (0.31 mmol) were dissolved in 130 mL of water under 75° C. while being stirred for 5 days to perform a polymerization reaction to obtain a resulting solution. After the reaction was completed, most of water was evaporated under reduced pressure. The resulting solution was then added to methanol/ethyl acetate to perform re-precipitation to obtain poly(Ita-HEAMOBA-co-acrylic acid). The poly(Ita-HEAMOBA-co-acrylic acid) was analyzed by $^1$H NMR and the data are shown as follows.

$^1$H NMR (d-MeOH, 400 MHz): δ=3.71 (t, 2H), 3.69-3.35 (1H), 3.02 (t, 2H), 2.8-2.4 (1H), 2.4-2.1 (1H), 2.1-1.8 (1H), 1.8-1.2 (2H).

(II) Preparation of the Polyphenylene Ether

First, 0.56 g of $CuBr_2$ (2.5 mmol), 0.84 g of poly(Ita-HEAMOBA-co-acrylic acid) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

Example 6

Preparation of the Polyphenylene Ether (6) (the Water-Soluble Linear Polymer in the Aqueous-Phase Catalyst Composition: Poly(Ita-HEAMOBA-Co-Acrylic Acid) (Mn=5,600); Metal Ion: Water-Soluble Linear Polymer=1:4.5 (Weight Ratio))

(I) Preparation of the Poly(Ita-HEAMOBA-Co-Acrylic Acid)

First, 6.4 g of Ita-HEAMOBA (37 mmol), 4 g of acrylic acid (55.6 mmol) and 0.5 g of AIBN (0.31 mmol) were dissolved in 130 mL of water under 75° C. while being stirred for 5 days to perform a polymerization reaction to obtain a resulting solution. After the reaction was completed, most of water was evaporated under reduced pressure. The resulting solution was then added to methanol/ethyl acetate to perform re-precipitation to obtain poly(Ita-HEAMOBA-co-acrylic acid). The poly(Ita-HEAMOBA-co-acrylic acid) was analyzed byl H NMR and the data are shown as follows.

$^1$H NMR (d-MeOH, 400 MHz): δ=3.71 (t, 2H), 3.69-3.35 (1H), 3.02 (t, 2H), 2.8-2.4 (1H), 2.4-2.1 (1H), 2.1-1.8 (1H), 1.8-1.2 (2H).

(II) Preparation of the Polyphenylene Ether

First, 0.56 g of $CuBr_2$ (2.5 mmol), 2.52 g of poly(Ita-HEAMOBA-co-acrylic acid) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

Example 7

Preparation of the Polyphenylene Ether (7) (the Water-Soluble Linear Polymer in the Aqueous-Phase Catalyst Composition: Poly(Ita-HEAMOBA-Co-Acrylamide) (Mn=8,200); Metal Ion: Water-Soluble Linear Polymer=1:1.5 (Weight Ratio))

(I) Preparation of the Poly(Ita-HEAMOBA-Co-Acrylamide)

First, 6.4 g of Ita-HEAMOBA (37 mmol), 4 g of acrylamide (56.3 mmol) and 0.5 g of AIBN (0.31 mmol) were dissolved in 130 mL of water under 75° C. while being stirred for 5 days to perform a polymerization reaction to obtain a resulting solution. After the reaction was completed, most of water was evaporated under reduced pressure. The resulting solution was then added to methanol/ethyl acetate to perform re-precipitation to obtain poly(Ita-HEAMOBA-co-acrylamide). The poly(Ita-HEAMOBA-co-acrylamide) was analyzed by $^1$H NMR and the data are shown as follows.

$^1$H NMR (d-MeOH, 400 MHz): δ=3.75 (t, 1H), 3.75-3.40 (2H), 3.12 (t, 111), 2.8-2.4 (1H), 2.4-1.8 (2H), 1.8-1.2 (2H).

(II) Preparation of the Polyphenylene Ether

First, 0.56 g of $CuBr_2$ (2.5 mmol), 0.84 g of poly(Ita-HEAMOBA-co-acrylamide) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

Example 8

Preparation of the Polyphenylene Ether (8) (the Water-Soluble Linear Polymer in the Aqueous-Phase Catalyst Composition: Poly(Ita-HEAMOBA-Co-Acrylamide) (Mn=8,200); Metal Ion: Water-Soluble Linear Polymer=1:4.5 (Weight Ratio))

(I) Preparation of the Poly(Ita-HEAMOBA-Co-Acrylamide)

First, 6.4 g of Ita-HEAMOBA (37 mmol), 4 g of acrylamide (56.3 mmol) and 0.5 g of AIBN (0.31 mmol) were dissolved in 130 mL of water under 75° C. while being stirred for 5 days to perform a polymerization reaction to obtain a resulting solution. After the reaction was completed, most of water was evaporated under reduced pressure. The resulting solution was then added to methanol/ethyl acetate to perform re-precipitation to obtain poly(Ita-HEAMOBA-co-acrylamide). The poly(Ita-HEAMOBA-co-acrylamide) was analyzed by $^1$H NMR and the data are shown as follows.

$^1$H NMR (d-MeOH, 400 MHz): δ=3.75 (t, 1H), 3.75-3.40 (2H), 3.12 (t, 1H), 2.8-2.4 (1H), 2.4-1.8 (2H), 1.8-1.2 (2H).

(II) Preparation of the Polyphenylene Ether

First, 0.56 g of $CuBr_2$ (2.5 mmol), 2.52 g of poly(Ita-HEAMOBA-co-acrylamide) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

Example 9

Preparation of the Polyphenylene Ether (9) (the Water-Soluble Linear Polymer in the Aqueous-Phase Catalyst Composition: Poly(Ita-HEAMOBA-Co-Acrylic Acid) (Mn=4,800); Metal Ion: Water-Soluble Linear Polymer=1:1.5 (Weight Ratio))

(I) Preparation of the Poly(Ita-HEAMOBA-Co-Acrylic Acid)

First, 6.4 g of Ita-HEAMOBA (37 mmol), 4 g of acrylic acid (55.6 mmol) and 0.5 g of AIBN (0.31 mmol) were dissolved in 130 mL of water under 75° C. while being stirred for 5 days to perform a polymerization reaction to obtain a resulting solution. After the reaction was completed, most of water was evaporated under reduced pressure. The resulting solution was then added to methanol/ethyl acetate to perform re-precipitation to obtain poly(Ita-HEAMOBA-co-acrylic acid). The poly(Ita-HEAMOBA-co-acrylic acid) was analyzed by $^1$H NMR and the data are shown as follows.

$^1$H NMR (d-MeOH, 400 MHz): δ=3.71 (t, 2H), 3.69-3.35 (1H), 3.02 (t, 2H), 2.8-2.4 (1H), 2.4-2.1 (1H), 2.1-1.8 (1H), 1.8-1.2 (2H).

(II) Preparation of the Polyphenylene Ether

First, 0.62 g of Nickel (II) acetate tetrahydrate (2.5 mmol), 0.84 g of poly(Ita-HEAMOBA-co-acrylic acid) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 1.

TABLE 1

| Examples | Water-soluble linear polymer | Yield (%) | Molecular weight | Polydispersity index (PDI) |
|---|---|---|---|---|
| 1 | PEG | 68 | 5,500 | 2.4 |
| 2 | PVA | 62 | 6,000 | 2.5 |
| 3 | PIA | 62 | 5,200 | 1.8 |
| 4 | Poly(itaconic acid-co-acrylamide) | 46 | 3,700 | 1.6 |
| 5 | Poly(Ita-HEAMOBA-co-acrylic acid) | 40 | 3,233 | 1.48 |
| 6 | Poly(Ita-HEAMOBA-co-acrylic acid) | 64 | 2,056 | 1.30 |
| 7 | Poly(Ita-HEAMOBA-co-acrylamide) | 66 | 2,842 | 1.60 |
| 8 | Poly(Ita-HEAMOBA-co-acrylamide) | 81 | 2,205 | 1.58 |
| 9 | Poly(Ita-HEAMOBA-co-acrylic acid) | 25 | 1,645 | 1.15 |

Comparative Example 1

Preparation of the Polyphenylene Ether (the Water-Soluble Compound in the Aqueous-Phase Catalyst Composition: Itaconic Acid (Mn=130.1); Metal Ion: Water-Soluble Compound=1:1.8 (Weight Ratio))

First, 0.56 g of copper bromide ($CuBr_2$) (2.5 mmol), 1 g of itaconic acid (IA) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 2.

Comparative Example 2

Preparation of the Polyphenylene Ether (the Water-Soluble Linear Polymer in the Aqueous-Phase Catalyst Composition: PEG (Mn=400); Metal Ion: Water-Soluble Linear Polymer=1:1.8 (Weight Ratio))

First, 0.56 g of $CuBr_2$ (2.5 mmol), Ig of polyethylene glycol and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 2.

Comparative Example 3

Preparation of the Polyphenylene Ether (the Water-Soluble Linear Polymer in the Aqueous-Phase Catalyst Composition: PVA (Mn=10,000); Metal Ion: Water-Soluble Linear Polymer=1:8 (Weight Ratio))

First, 0.56 g of $CuBr_2$ (2.5 mmol), 4.48 g of polyvinyl alcohol (PVA) and 40 mL of water were added to a 100-mL double-neck bottle and heated to 50° C. while being stirred for 30 minutes.

Next, 3.1 g of dimethyl phenol monomer (25 mmol), 1.0 g of sodium hydroxide (25 mmol) and 0.91 g of sodium hexadecyl sulfate (SHDS) (2.5 mmol) dissolved in 40 mL of water were added to the double-neck bottle with conducting oxygen gas and stirring for 12 hours to obtain a resulting solution. After the reaction was completed, a few drops of hydrochloric acid were added to the resulting solution to stop the reaction. The resulting solution was then added to 650 mL of methanol to perform re-precipitation. A first product was then collected through an air-extracting apparatus.

After purification, the first product was dissolved in THF and added to methanol to perform re-precipitation. A second product was then collected through the air-extracting apparatus. Next, the second product was dried in an oven to prepare the polyphenylene ether (PPE). Finally, the yield, molecular weight and polydispersity index (PDI) of the polyphenylene ether (PPE) were then calculated and are shown in Table 2.

TABLE 2

| Comparative Examples | Water-soluble linear polymer | Yield (%) | Molecular weight | Polydispersity index (PDI) |
|---|---|---|---|---|
| 1 | IA | 56 | 4,700 | 2.0 |
| 2 | PEG | 66 | 5,900 | 2.9 |
| 3 | PVA | 68 | 5,300 | 3.1 |

In the disclosure, a novel environmental process for preparing polyphenylene ether (PPE) is developed. In this process, an oxidative polymerization reaction between phenolic monomers and a stable complex (i.e. aqueous-phase catalyst) formed of a water-soluble linear polymer having a molecular weight ranging from 1,000 to 20,000 and a metal ion with a specific ratio (for example, metal ion: water-soluble linear polymer=1:1 to 1:5) is performed. Compared to the current solvent process for industrial production, in the present aqueous-phase polymerization method for synthesizing polyphenylene ether (PPE), polyphenylene ether (PPE) is effectively prepared under an aqueous environment, having the advantages of low environmental hazard and low cost. Additionally, in accordance with the structure and composition of water-soluble linear polymers (i.e. obtaining various expected copolymers using free-radical polymerization methods) in the processes, in addition to improvement of the yield, the polydispersity index (PDI) of polyphenylene ether (PPE) is also effectively decreased to about 1.3, obtaining polyphenylene ether (PPE) with a high uniformity, which is quite beneficial to the future development and application of high-order precision electronic materials.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. An aqueous-phase catalyst composition, comprising:

a metal ion comprising copper, nickel, manganese or iron; and a water-soluble linear polymer having a molecular weight ranging from 1,000 to 20,000, wherein the metal ion and the water-soluble linear polymer have a weight ratio of 1:1 to 1:5.

2. The aqueous-phase catalyst composition as claimed in claim 1, wherein the water-soluble linear polymer comprises polyethylene glycol (PEG), polyvinyl alcohol (PVA) or polyitaconic acid (PIA).

3. The aqueous-phase catalyst composition as claimed in claim 1, wherein the water-soluble linear polymer comprises poly(itaconic acid-co-acrylamide), poly(Ita-HEAMOBA-co-acrylic acid) or poly(Ita-HEAMOBA-co-acrylamide).

4. The aqueous-phase catalyst composition as claimed in claim 1, wherein the water-soluble linear polymer is represented by the following structural formula:

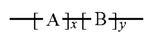

wherein A comprises at least one carboxyl group or amide group, II comprises at least one of at least one carboxyl group and carboxyl group and amide group, x ranges from 1 to 100, and y ranges from 1 to 100.

5. The aqueous-phase catalyst composition as claimed in claim 4, wherein the water-soluble linear polymer has a molecular weight ranging from 4,000 to 8,500.

6. The aqueous-phase catalyst composition as claimed in claim 4, wherein the water-soluble linear polymer comprises poly(itaconic acid-co-acrylamide), poly(Ita-HEAMOBA-co-actylic acid) or poly(Ita-HEAMOBA-co-acrylamide).

7. The aqueous-phase catalyst composition as claimed in claim 1, wherein the water-soluble linear polymer is represented by the following formula:

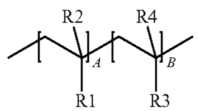

wherein R1 comprises carboxyl group or amide group, R2 comprises hydrogen, C1-C9 alkyl group or carboxyl group, R3 comprises carboxyl group or amide group, R4 comprises carboxyl group, A ranges from 1 to 100, and B ranges from 1 to 100.

8. The aqueous-phase catalyst composition as claimed in claim 7, wherein the water-soluble linear polymer has a molecular weight ranging from 4000 to 8500.

9. The aqueous-phase catalyst composition as claimed in claim 7, wherein the water-soluble linear polymer comprises poly(itaconie acid-co-acrylamide), poly(Ita-HEAMOBA-co-acrylic acid) or poly(Ita-HEAMOBA-co-actylamide).

10. The aqueous-phase catalyst composition as claimed in claim 1, wherein the metal ion and the water-soluble linear polymer have a weight ratio of 1:1.5 to 1:4.5.

11. The aqueous-phase catalyst composition as claimed in claim 1, wherein the water-soluble linear polymer has a molecular weight ranging from 4,000 to 8,500.

12. A method for preparing polyphenylene ether, comprising:

providing an aqueous-phase catalyst composition as claimed in claim 1; and adding phenolic monomers to the aqueous-phase catalyst composition to proceed to a polymerization reaction to prepare polyphenylene ether.

13. The method for preparing polyphenylene ether as claimed in claim 12, wherein the phenolic monomer is represented by the following formula:

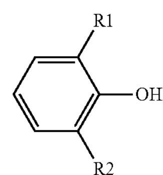

wherein R1 and R2 independently comprises hydrogen, C1-C6 alkyl group or phenyl group.

14. The method for preparing polyphenylene ether as claimed in claim 12, wherein the polymerization reaction is an oxidative polymerization reaction.

15. The method for preparing polyphenylene ether as claimed, in claim 12, further comprising adding a surfactant to the aqueous-phase catalyst composition to proceed to the polymerization reaction.

16. The method fix preparing polyphenylene ether as claimed in claim 12, wherein the polymerization reaction is performed in an aqueous solvent and/or basic reaction conditions.

* * * * *